Jan. 23, 1962   J. F. REDLINGER   3,018,095
METHOD OF HYDRAULIC FRACTURING IN UNDERGROUND FORMATIONS
Filed July 23, 1958   2 Sheets-Sheet 1

INVENTOR
Jacob F. Redlinger
BY
Hammond
ATTORNEYS

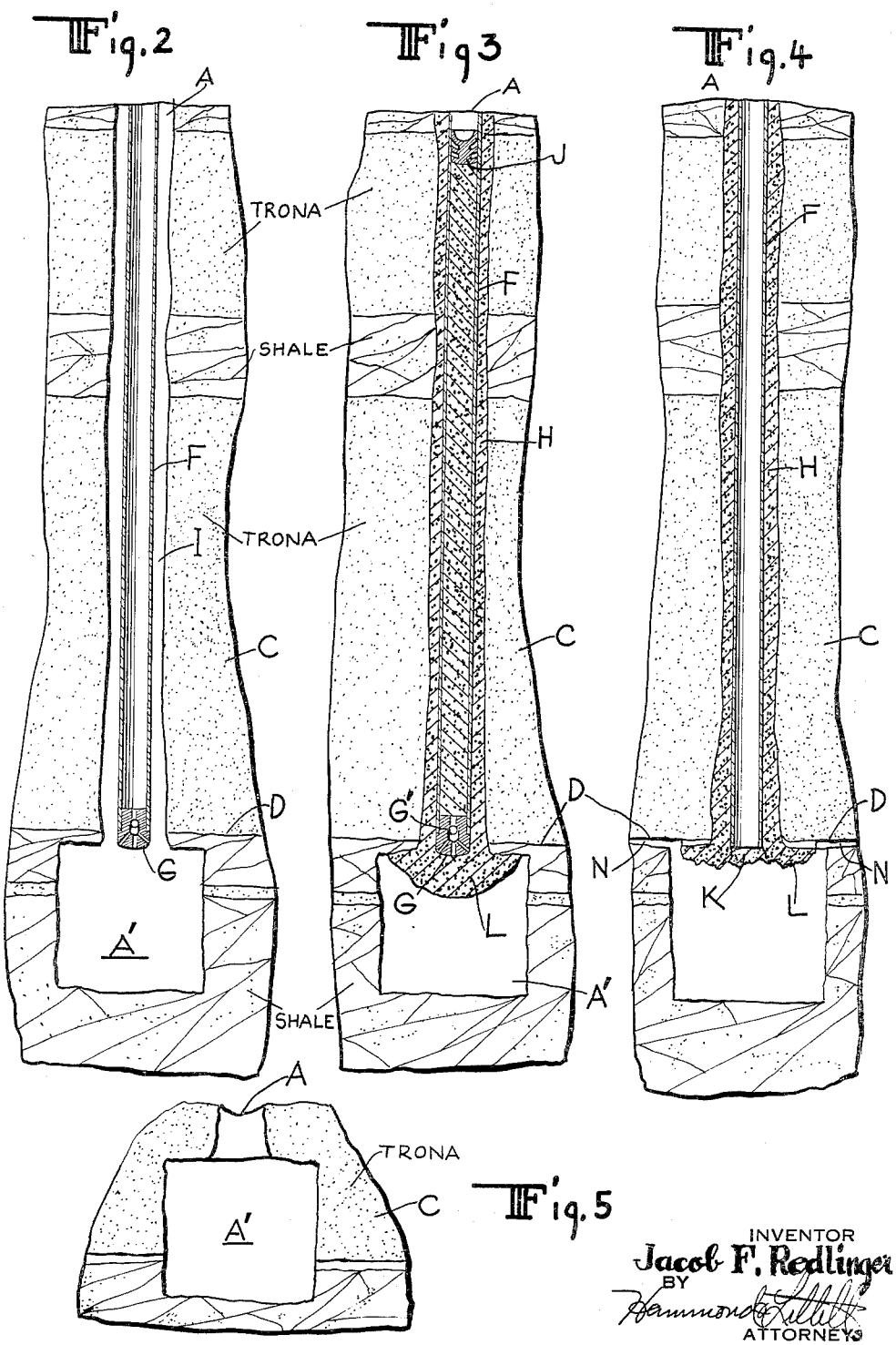

United States Patent Office 3,018,095
Patented Jan. 23, 1962

3,018,095
METHOD OF HYDRAULIC FRACTURING IN UNDERGROUND FORMATIONS
Jacob F. Redlinger, Kansas City, Kans., assignor, by mesne assignments, to FMC Corporation, New York, N.Y., a corporation of Delaware
Filed July 23, 1958, Ser. No. 750,404
2 Claims. (Cl. 262—3)

This invention relates to a method of fracturing and bringing about underground communication between spaced wells in dense impervious underground formations, such as salt beds, sulfur beds, mineral beds and the like. These formations preferably contain a lithological stratum which is soluble in or removable by a removal liquid, lying immediately above a lithological stratum of a different composition which is insoluble in said removal liquid and have a clear parting line interface between the two strata. The invention also relates to a method of initially directing said fracture substantially along a horizontal plane or along a desired substantially horizontal interface, and to a method of preparing well bores in such dense impervious homogeneous underground formation for fracturing between spaced wells over large distances initially along such a natural interface or initially along a substantially horizontal plane at any desired depth in the formation.

In the field of oil well drilling and operation, hydraulic fracturing is often employed within the oil sand formation for the purpose of opening up the formation and increasing the flow of oil therefrom to a particular single well. The oil sands in which these operations have been most successful are often so porous that it is necessary to use jelling agents in the fracturing fluid or to use special high viscosity fluids in order to prevent the fracturing fluid from flowing into the formation so rapidly that the necessary fracturing pressure cannot be developed. Gels are also used in porous oil sand formations to develop multiple fractures to increase drainage from the oil sand. It is also customary to use propping agents to prevent closure of the fracture after it has been formed.

Where the principal pressure on the formation is the pressure of the overburden these fractures tend to develop in a vertical or inverted conical direction around the base of the well casing (see "Mechanics of Hydraulic Fracturing" by M. King Hubbert and David G. Willis, Paper No. 686-G, American Institute of Mining, Metallurgical and Petroleum Engineers).

In fracturing between spaced wells in dense underground formations, such as salt beds, sulfur beds, mineral formations and the like for the purpose of removing the salt, sulfur, mineral deposits and the like, by solution flowing between adjacent wells or by liquifaction, the methods used in the oil industry are not suitable to accomplish the desired results.

In soluble salt formations and particularly in trona formations, the beds are usually found in substantially horizontal planes of various thickness with an underlying and overlying earth formation of clay, shale, stone or the like. The line of separation between the salt beds and the underlying and overlying earth formation is usually sharply defined and at any given point lies substantially in a horizontal plane. Unlike the oil sand formations where it is desirable to produce the fracture near the center or top of the formation and to produce multiple fractures to recover the most oil therefrom, in the recovery of soluble salts, sulfur or soluble minerals from underground formations, it is desirable to produce a single fracture substantially at the bottom of the salt or sulfur formation and along the top of the underlying insoluble earth or shale stratum and to direct the fracture to the next adjacent well substantially horizontally along the interface between the bottom of the stratum to be removed and the top of the underlying earth stratum so that the salt, sulfur or the like will be dissolved or removed from the bottom upwardly.

By dissolving the salt from the bottom upwardly a number of advantages can be obtained. The less concentrated and less saturated solvent flowing along the bottom of the salt bed rises to the top of the solvent layer and contacts the bottom of the salt bed, dissolves salt therefrom and as it becomes more saturated, settles to a lower layer of the solvent body so that the bottom of the salt formation is always exposed to dissolution by less concentrated solvents. As the inlet to the outlet well casing is at the bottom of the formation, the most concentrated solution flows from the outlet well. The undissolved salt layer above the solution acts as a roof support to prevent caving which might prematurely clog the passage between wells or clog one of the wells. The insoluble materials in the salt formation can settle through the underlying solution layer to the earthy bottom of the solution cavity and deposit thereon so that only clear solutions are recovered from the wells, etc. Similar advantages are secured in melting and removing sulfur from the bottom upwardly and in dissolving and removing most minerals, although in some instances it may be desirable to dissolve or liquify the mineral from the top downward.

One of the objects of this invention is, therefore, to provide a method for initially directing a fracture between two or more spaced wells produced by hydraulic fracturing in a dense salt, sulfur or other mineral formation substantially horizontally along the bottom of the salt or other bed and substantially at the interface of the salt bed and the underlying earth formation.

Another object of this invention is to provide a method of preparing wells for hydraulic fracturing in a dense salt or mineral formation whereby the fracturing pressure will tend to be directed along the interface between the salt or mineral bed and the underlying earth formation.

Another object of this invention is to provide a method of hydraulic fracturing in dense underground salt or mineral formations whereby vertical fracturing of the salt or mineral bed will be retarded or eliminated and horizontal fracturing preferably along the interface of the salt or mineral bed and the underlying earth formation toward the adjacent well or wells promoted.

Another object of this invention is to provide a method of preventing rupture of the salt formation adjacent the well casing and dislodgement of the casing during hydraulic fracturing operations.

Another object of this invention is to promote fracturing initially along a substantially horizontal plane between spaced wells in a dense underground formation.

Various other objects and advantages of this invention will become apparent as the description proceeds.

One embodiment of the invention will be described in connection with the hydraulic fracturing and solution mining of trona deposits found in the vicinity of Green River, Wyoming. It will be apparent, however, that the principles of the invention are applicable to the fracturing and solution mining of dense salt formations wherever they may be found and to similar dense formations, such as sulfur deposits, mineral deposits and the like.

In the vicinity of Green River, Wyoming, extensive deposits of trona have been found in substantially horizontal beds at a depth of approximately 1500 ft. underground. The bottom-most bed is approximately 11 ft. in thickness and for approximately 300 ft. above this bed various thinner beds of trona occur. The bottom trona bed lies on top of an oil shale formation and layers of oil shale separate the different trona beds. The shale beds and the trona beds are substantially dry and impermeable and the shale beds are substantially water impervious.

Referring now to the drawings which illustrate a preferred embodiment of the invention—

FIG. 2 illustrates the bottom of one of the wells after underreaming and before cementing the casing in place.

FIG. 3 illustrates the appearance of the bottom of one of the wells after cementing but before drilling out the cement float distributor shoe.

FIG. 4 illustrates the appearance of the well after the application of the fracturing pressure, and FIG. 5 illustrates the underreamed section substantially all located in the bottom trona bed.

Figure 1:
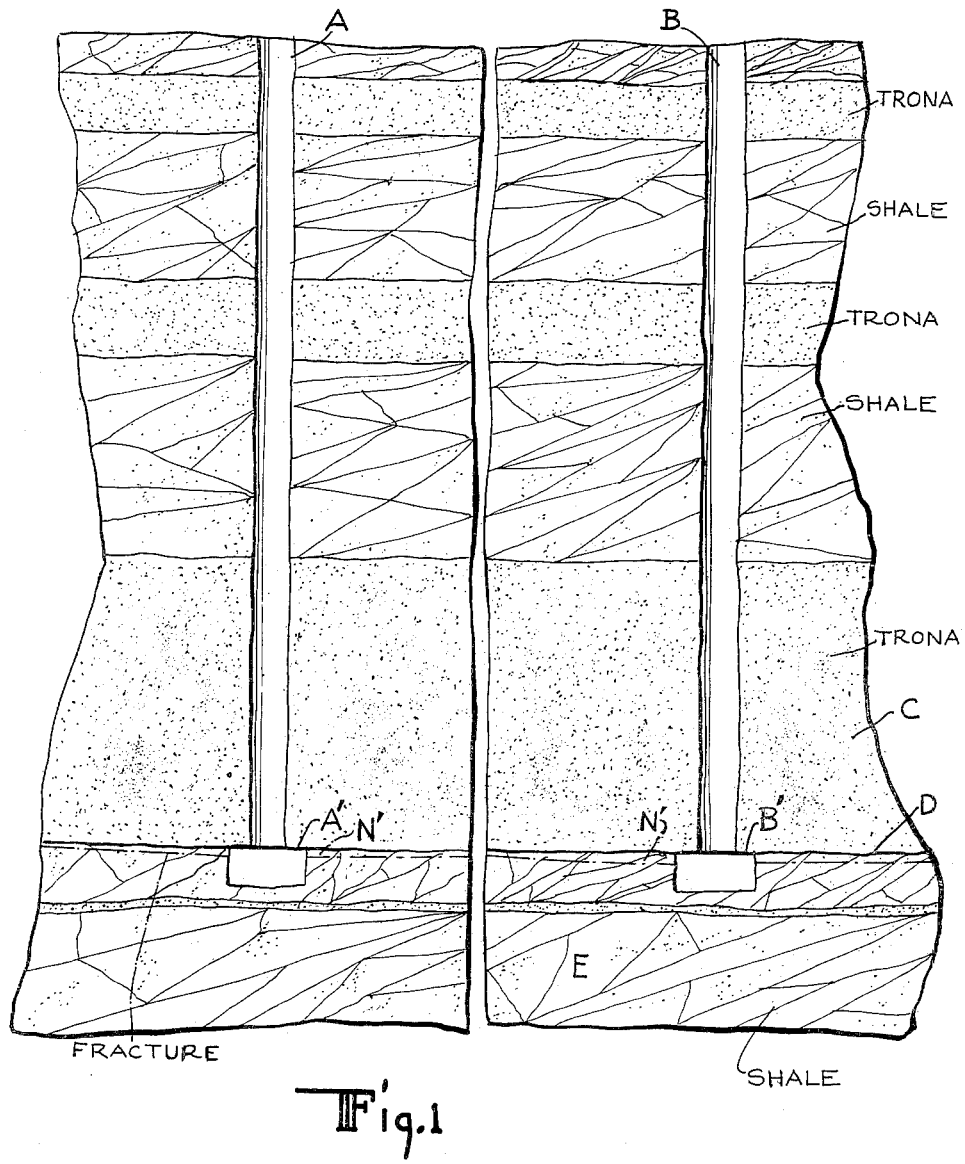
FIG. 1 is a cross-sectional view illustrating the lower portion of the Green River, Wyoming trona deposit showing two wells extending to the bottom of the lowest trona bed.

As illustrated in FIG. 1 two wells A and B have been drilled into the trona formation to the bottom of the lowest trona bed C. At the bottoms the wells have been underreamed as indicated at A' and B' with the underream starting substantially at the interface of the lowest trona bed and the shale layer and extending about 5 ft. into the lower shale bed.

While it is preferable in opening soluble salt formations to solution mining to locate the underream so that the top portion is substantially in line with the interface beween the salt bed and the underlying earth stratum, this is not essential, as, depending on the depth of the salt bed, the top of the underream may be located either in the salt bed or in the underlying stratum just slightly below the salt bed and still accomplish the objective of this invention. The essential condition, as will be later described, is that the parting pressure applied by the fracturing fluid should be applied downwardly on the underlying stratum and upwardly on the salt stratum, substantially at the parting line so as to cause initial separation of the strata substantially horizontally between wells A and B and essentially along the parting line D. It is important in other homogeneous formations that the top of the underream be located at that portion of the formation where the horizontal fracture is to be initiated.

During drilling through the earth formation above the trona beds, normal well drilling practice is followed using a drilling mud suitable to the overlying formation. When drilling through the trona beds a special drilling mud having a high content of a soluble salt such as sodium chloride, soda ash or trona is used so that the mud does not dissolve the exposed edges of the trona beds. In this manner a substantially smooth bore is produced through the trona beds. A suitable drilling mud composition for this purpose is as follows:

| | Lbs./bbl. |
|---|---|
| "Zeogel" | 30.5 |
| Water soluble starch | 9 |
| Sodium carboxymethyl cellulose | 0.5 |
| Sodium chloride | 110 |
| Sodium carbonate | 20 |
| Sodium bicarbonate (per 55 gallon barrel) | 4 |

("Zeogel" is a trade name of the National Lead Company for a clay which retains its colloidal properties in the presence of salts.)

When the bottom of the lowest trona bed C is reached, as determined by core samples and the known depth of the bed below the surface, the wells A and B are drilled approximately 5 ft. into the shale bed below the lowest trona bed C and the wells are reamed the entire length to the desired size, in the specific instance to a diameter of 12¼ inches. The interface D between the lowest trona bed C and the underlying shale layer E is then located by the core samples, measurement from the surface and by well logging methods. When this interface is accurately located an underreaming tool is lowered into the wells A or B to the correct depth and each well is underreamed to a diameter of 3 ft. with the underream beginning at substantially the interface or slightly above or below the interface and extending approximately 5 ft. into the lower shale bed. During the underreaming the drilling mud having a high soluble salt content is used to lubricate the underreaming tool and carrying the cuttings out of the hole and at the end of the underreaming operation the drilling mud is left in the underreamed portions A' and B' of the well bores. The underreaming serves to weaken the formation along a substantially horizontal plane at the depth or location at which the horizontal fracture is to be initiated.

After the underreaming operation casings F are lowered into the wells to the interface D. A float distributor shoe G as illustrated in FIGS. 2 and 3 is located at the bottom of the casing and normally a float collar (not illustrated) is located in the casing one or two joints above the float distributor shoe. The float distributor shoe may be of the whirling type to provide better cement distribution. Cement is then pumped into the casing and rises between the casing and the well bore. Due to the shape of the float distributor shoe G the cement is directed radially from the bottom of the casings F in a plurality of streams where it rises along the outside of the casing and fills the space I between the outer walls of the casings F and the walls of the drill holes A and B. Due to the presence of the drilling mud in the underreamed sections A' and B' the cement does not enter substantially into the underreamed portions of the wells A and B but is believed to partially displace the drilling mud at the top of the underreamed sections and assume substantially the shape of an inverted mushroom extending outwardly along the bottom of the lower trona bed C as illustrated at L.

When the calculated amount of cement necessary for cementing the well, to the surface, or to any desired distance upwardly from the bottom of the well, has been pumped into the casing F of well A or B, a top plug J is inserted into the casing F from the top. Water or any other suitable hydraulic fluid is pumped into the casing F above the plug J to force the plug J downward and force the cement in the casing out through the float shoe G where it rises along the casing to the surface of the ground or to the desired distance below the surface necessary for firmly cementing the casing in the well as indicated at H. For ease in subsequent drilling out, the plug J is preferably formed of molded plastic such as Bakelite or the like, and the interior of the float collar and float distributor shoe G containing the value G' is formed of a suitable cement composition which may be readily drilled through.

Any suitable cementing composition, which when set, forms a very firm bond between the trona layer and the well casing may be used.

After allowing sufficient time for the cement to set, normally about 1 to 5 days, a drill bit is lowered into the casing F, the top plug J, the float collar and the interior of the float distributor shoe G are drilled out and a hole K is drilled through the cement in the upper portion of the underreamed sections A' and B'. At this point the lower end of the well is believed to be substantially as illustrated at L with a portion of the cement extending outwardly along the lower face of the trona bed C beyond the drilled circumference of the wells A and B but terminating short of the outer circumference of the underreamed sections A' and B'.

The drill bit is then lowered a short distance into the drilling mud remaining in the underreamed sections, below the cement and water or any other dissolving fluid is circulated through the drilling mud to wash the mud out of the hole and carry it together with any cuttings remaining in the underreamed sections to the surface through the casing F. The drilling mud is a thixiotropic material which remains fluid during pumping, but sets to a thick gel when permitted to remain stationary. The water or dissolving fluid is circulated through the underreamed sections A' and B' in order to dilute and remove all of the drilling mud, debris and cuttings in the underreamed sections below the cement plugs L.

The vertical and horizontal dimensions of the underream and the exact method of providing the underream, cementing the well, drilling out the cement, etc., are not critical, but have been described in detail to better illustrate the invention. It is important, however, that the underreamed section have square shoulders at the top thereof to weaken the formation along a substantially horizontal plane and to provide a horizontal lifting shelf and that all debris, cuttings, etc., are removed from the hole. The underream need not be cylindrical or concentric with the bore hole and elliptical or eccentric underreamed sections can be provided by jet underreaming or special underreaming techniques. A cylindrical concentric underreamed section is, however, easier to provide and if it has the desired square shoulders at the top, it provides a lifting shelf for initially directing the fracture in a substantially horizontal direction at the desired point in the formation.

After the drilling mud has been washed out fracturing pressure is applied and the underreamed section A' and B' act as cylinders and the inverted plug L as a piston to initially lift the trona layer C substantially along the interface D and cause the oriented fracture illustrated at N in FIG. 4 to start in a substantially horizontal plane and spread along the lower trona bed and the underlying shale layer to the adjacent well. If desired, the fracturing pressure may be applied simultaneously to wells A and B or first to well A and then to well B or vice versa. The general line of the desired fracture between wells A and B is indicated by the dot and dash line N' in FIG. 1.

In the fracturing operation water or any other hydraulic fluid is pumped into the top of casing F with high pressure pumping equipment and in the Green River, Wyoming trona deposit, when a bottom hole pressure of about 2300 p.s.i. is reached the formation ruptures substantially at the top of the underreamed or weakened section which is located at the shale-trona interface with a corresponding drop in bottom hole pressure to about 1600 p.s.i. Continued pumping of water into the formation at this pressure causes the fracture to spread radially from the well to which the pressure has been applied until the fracture from one well A is brought into communication with an adjacent well B or with a corresponding fracture from an adjacent well B. Once started on a weakened horizontal plane in the formation the fracture tends to continue along the original fracturing plane. By following the procedure described above it has been possible to hydraulically fracture at a depth of approximately 1500 ft. between wells spaced 1200 ft. apart and to have substantially the entire fracture in the trona bed initially start at substantially the shale-trona interface. When a dissolving fluid is circulated down well A or B and out of the other well, trona solutions can be recovered and brought to the surface for processing into soda ash.

While the casings F have been illustrated as terminating at the top of the underreamed sections A' and B', the casings may extend part of the distance into the underreamed sections or may be extended to the bottom of the underreamed sections and may have their wall perforated opposite the underreamed sections so that the hydraulic fluid pumped into the casings will enter the underreamed section and exert its separating or fracturing force on the top and bottom of the underreamed sections to cause hydraulic fracturing of the formation initially in a substantially horizontal plane.

During the hydraulic lifting of the formation the casings F and the surrounding cement H and plug L securing the casings in the formation prevent rupture of the salt formation adjacent the well casing and dislodgement of the casing within the formation.

The casings F have been omitted from wells A and B in FIG. 1 for purpose of better illustration and description, but it will be understood that in the completed wells the casings F and cement H will occupy a position substantially as illustrated in FIG. 4 and the fracture will be initiated substantially along the line N'.

While it is preferred to weaken the formation along a horizontal plane at an interface between a soluble and an insoluble strata and to provide a lifting shelf, by underreaming as described above, it is also possible to enlarge the well bore and weaken the formation and form a workable but less satisfactory lifting shelf by firing shaped charges from a shaped charge gun perforator or similar device in a single horizontal plane into the formation at the interface or any other desired part of the formation.

In a similar manner to that described above, a substantially horizontal fracture can be initiated at trona-shale interfaces above the bottom interface, to facilitate solution mining of intermediate trona beds as well as the lowest bed.

The term salt as used herein is intended to include sodium chloride, potash, trona, etc., and to be illustrative of the application of the invention to all soluble underground formations forming a clear interface with the underlying earth stratum and the term mineral beds is intended to include all mineral deposits which can be liquified by heat or chemical reaction and removed in liquid phase from the formation. The term hydraulic fracturing is intended to include fracturing by means of hydraulic liquids, such as water, oil or the like, or by means of gases.

While a specific embodiment and application of the invention has been described it will be understood that it is applicable to hydraulic fracturing in all salt and other dense homogeneous underground formations and that various modifications and changes may be made from the procedure described without departing from the spirit of the invention or the scope of the following claims.

I claim:

1. The method of directing a fracture produced by hydraulic fracturing of an underground formation initially in a substantially horizontal plane between two wells which comprises drilling two wells into the formation to the desired point of fracture, circulating a drilling mud through the wells during the drilling, underreaming one of the wells below the desired point of fracture and leaving drilling mud in the underreamed section, casing the well, cementing the casing in the well, spreading the cement horizontally along the top of the drilling mud in the underreamed section, washing out the drilling mud in the underreamed sections and applying a hydraulic fracturing pressure to the underreamed section to cause separation of the formation at substantially the top of the underreamed section and spread of the fracture to the adjacent well.

2. The method of fracturing a dense underground formation between the wells, which comprises drilling two wells into the formation to the depth where the fracture is to be produced, circulating a drilling mud through the wells during the drilling, underreaming one of the wells below the depth where the fracture is to be produced and leaving the underreamed section filled with drilling mud, setting a casing in the well to the top of the underreamed section, cementing the casing in the well and spreading the cement along the top of the underreamed section, drilling through the cement in the underreamed section, removing the drilling mud from the underreamed section and applying a hydraulic fracturing pressure to the underreamed section by pumping a hydraulic fluid into said casing to fracture the formation between said wells.

References Cited in the file of this patent

UNITED STATES PATENTS

| | | |
|---|---|---|
| 2,368,424 | Reistle | Jan. 30, 1945 |
| 2,547,778 | Reistle | Apr. 3, 1951 |
| 2,699,212 | Desmukes | Jan. 11, 1955 |
| 2,821,255 | Spearow | Jan. 28, 1958 |
| 2,847,202 | Pullen | Aug. 12, 1958 |
| 2,859,818 | Hall et al. | Nov. 11, 1958 |